United States Patent
An et al.

(10) Patent No.: US 12,539,535 B2
(45) Date of Patent: Feb. 3, 2026

(54) PUNCH AND A DIE FOR STRETCHING BATTERY CASE BODY AND STRETCHING PROCESS THEREFOR

(71) Applicant: SUZHOU SLAC PRECISION EQUIPMENT CO., LTD, Jiangsu (CN)

(72) Inventors: Shu An, Suzhou (CN); Yang Wang, Suzhou (CN); Zhihua Yang, Suzhou (CN); Yin Wang, Suzhou (CN)

(73) Assignee: SUZHOU SLAC PRECISION EQUIPMENT CO., LTD, Suzhou (CN)

( * ) Notice: Subject to any disclaimer, the term of this patent is extended or adjusted under 35 U.S.C. 154(b) by 325 days.

(21) Appl. No.: 18/026,519

(22) PCT Filed: May 6, 2021

(86) PCT No.: PCT/CN2021/091827
§ 371 (c)(1),
(2) Date: Mar. 15, 2023

(87) PCT Pub. No.: WO2022/057274
PCT Pub. Date: Mar. 24, 2022

(65) Prior Publication Data
US 2023/0347403 A1    Nov. 2, 2023

(30) Foreign Application Priority Data
Sep. 15, 2020  (CN) .......................... 202010964743.6

(51) Int. Cl.
*B21D 22/28*     (2006.01)
*H01M 50/119*   (2021.01)

(52) U.S. Cl.
CPC ........... *B21D 22/28* (2013.01); *H01M 50/119* (2021.01)

(58) Field of Classification Search
CPC ......... B21D 22/28; B21D 37/10; B21D 51/10
See application file for complete search history.

(56) References Cited

U.S. PATENT DOCUMENTS

| | | | |
|---|---|---|---|
| 8,413,478 B2* | 4/2013 | Tomaru .................. | B21D 22/30 72/379.4 |
| 2009/0249856 A1* | 10/2009 | Smyers .................. | B21D 22/28 72/332 |

FOREIGN PATENT DOCUMENTS

| | | | |
|---|---|---|---|
| CN | 101208817 A | 6/2008 | |
| CN | 101304825 A | 11/2008 | |

(Continued)

OTHER PUBLICATIONS

Jul. 29, 2021 International Search Report issued in International Patent Application No. PCT/CN2021/091827.

*Primary Examiner* — Teresa M Ekiert
(74) *Attorney, Agent, or Firm* — Oliff PLC

(57) ABSTRACT

A punch and a die for stretching battery case body and its stretching process. The die includes a stepped punch as a male die, at least one thinning ring as a female die, and a variable-wall-thickness stretching step, which belongs to the thinning stretching. When the sheet or plate is stretched to the cup-shaped stretching piece by at least one-time forming stretching, and then through the thinning stretching to finally obtain the variable-wall-thickness battery case body with thin wall in the middle and thick wall at one end or both ends in the axial direction. The body can reduce the material consumption of the middle section of the case body and ensure the roll-sealing strength of one end or both ends, thus solving the problem between the amount of materials and the reliability of the roll sealing caused by the wall thickness of the battery case body.

5 Claims, 8 Drawing Sheets

(56) References Cited

FOREIGN PATENT DOCUMENTS

| | | |
|---|---|---|
| CN | 101752515 A | 6/2010 |
| CN | 205645896 U | 10/2016 |
| CN | 110177628 A | 8/2019 |
| CN | 112157175 A | 1/2021 |
| WO | 2010/150649 A1 | 12/2010 |

* cited by examiner

PUNCH AND A DIE FOR STRETCHING BATTERY CASE BODY AND STRETCHING PROCESS THEREFOR

TECHNICAL FIELD

The application relates to the field of case body processing, in particular to a punch and a die for stretching battery case body and stretching process therefor.

BACKGROUND OF INVENTION

The new energy vehicle uses the battery pack as the power source of the whole vehicle. The battery pack comprises a number of battery cells and the battery cell is the smallest unit that constitutes the new energy battery system, which is composed of positive pole, negative pole and electrolyte. The case of the battery cell is a battery case. A number of assembled battery cells are arranged in the battery pack in a parallel axis.

The battery case is composed of a case body and a lid. In the prior art, the case body is usually processed by cold pressing process, and the formed case body and the lid are processed into a whole by welding. However, the end of the battery case after welding has poor reliability and stability, and is prone to fracture, poor contact, poor explosion-proof performance and other problems; in addition, after the welded battery cases are assembled into a battery cell, the cases cannot be closely arranged due to the existence of welding seams, resulting in a low utilization rate of the space inside the battery pack.

If the case body and lid can be seamed by the roll-sealing process, the adverse effects of welding can be avoided. However, there is no stretching process for the roll-sealed battery case body at present, while the stretching process for other types of case bodies can only stretch the case bodies with the same wall thickness. Therefore, it is necessary to pay attention to the wall thickness of the battery case body when designing the roll-sealed battery case: If the wall thickness of the case body is too thick, it will not only increase the cost of materials, but also increase the weight of the battery pack, resulting in a decrease in the overall energy density of the battery pack; if the wall thickness of the case body is too thin, the end of the case body is easy to tear during the roll-sealing process or the case body is not reliable during the use after the sealing. Therefore, it is the best solution to solve the problem of the wall thickness of the battery case body if a variable wall thickness battery case body with thinner wall thickness at the middle section (to save materials) and thicker wall thickness at both ends (providing the strength of the roll-sealing) can be manufactured.

In view of this, the subject of this application is how to design a punch and a die for the stretching of battery case body and its stretching process, which can process the battery case body with variable wall thickness that can save materials and provide highly reliable sealing.

DISCLOSURE OF THE INVENTION

This application provides a punch and a die for stretching battery case body and its stretching process, which aims to solve the contradictory problem between the amount of materials and the reliability of the roll sealing caused by the wall thickness of the battery case body.

In order to achieve the above purpose, the technical scheme of the punch used in this application is: a punch for stretching the battery case body with the innovation: the punch is a stepped punch, its main body is a cylinder, the stepped punch is provided with a thick rod section, and the thick rod section is provided with a thin rod section on at least one end in the axial direction, and the difference between the radius of the thick rod section and the radius of the thin rod section is less than or equal to 0.3 mm and the radius ratio of the two is less than or equal to 101:100; and the thin rod section and the thick rod section are transitioned by means of at least one tapered surface or/and curved surface, and the ratio of the difference between the radius difference between the thick and thin rod sections to the projected length of the tapered surface or/and curved surface in the axial direction is less than 0.2.

In order to achieve the above purpose, the technical scheme of the die used in this application is: a die for stretching the battery case body, and a die is composed of a male die and a female die. Its innovation lies in:

The male die is composed of a stepped punch, which is a cylinder, the stepped punch is provided with a thick rod section, and the thick rod section is provided with a thin rod section on at least one end in the axial direction, and the difference between the radius of the thick rod section and the radius of the thin rod section is less than or equal to 0.3 mm and the radius ratio of the two is less than or equal to 101:100; and the thin rod section and the thick rod section are transitioned by means of at least one tapered surface or/and curved surface, and the ratio of the difference between the radius difference between the thick and thin rod sections to the projected length of the tapered surface or/and curved surface in the axial direction is less than 0.2.

The female die is composed of at least one thinning ring, which is arranged coaxially with the stepped punch; and the difference between the inner diameter of the thinning ring and the diameter of the thick rod section of the stepped punch is less than twice the wall thickness of the case body to be thinned.

The above technical scheme of the die is explained as follows:

1. In the above technical scheme of the die, its preferable that the female die is composed of at least two thinning rings, which are arranged coaxially with the stepped punch, and the inner diameters of the at least two thinning rings decreases successively along the punching direction.
2. In the above technical scheme of the die, it's preferable that the ratio of the wall thickness of the thinned piece after being thinned by the thinning ring corresponding to the thick rod section to the diameter of the thick rod section is 1:30.

In order to achieve the above purpose, the technical scheme adopted in the stretching process of this application is: a stretching process of battery case body includes thinning stretching, the number of thinning stretching is at least one, and its innovation is that the thinning stretching includes at least one variable-wall-thickness stretching for the thin wall section and thick wall section of the case body, and the variable-wall-thickness stretching is completed by using the following die with the punching equipment:

The die is composed of a male die and a female die, and the male die is composed of a stepped punch, which is a cylinder, the stepped punch is provided with a thick rod section, and the thick rod section is provided with a thin rod section on at least one end in the axial direction, and the difference between the radius of the thick rod section and the radius of the thin rod section is less than or equal to 0.3 mm and the radius ratio of the two is less than or equal to 101:100; and the thin rod section and the thick rod section are transitioned by means of through at least one tapered surface or/and curved surface, and the ratio of the difference between the radius difference between the thick and thin rod sections to the projected length of the cone or/and curved surface in the axial direction is less than 0.2.

The female die is composed of at least one thinning ring, which is arranged coaxially with the stepped punch; and the difference between the inner diameter of the thinning ring and the diameter of the thick rod section of the stepped punch is less than twice the wall thickness of the case body to be thinned.

In the process of variable-wall-thickness stretching, the stepped punch drives the piece to pass through each thinning ring sequentially, and then leave the die to obtain the thinned piece. The thinning piece comprises a thin wall section corresponding to the thick rod section of the stepped punch and a thick wall section corresponding to the thin rod section of the stepped punch, the thick wall section is located at one or both ends of the axial direction of the thinned piece, and there is at least one tapered surface or/and curved surface transition between the thin wall section and the thick wall section.

The above described technical scheme of stretching is explained as follows:

1. In the above technical scheme of stretching, for the stretching of the battery case body, the sheet or plate (such as aluminum alloy plate or aluminum alloy sheet) is usually used as the raw material (but the use of aluminum alloy ingot as the raw material is not excluded), and then the battery case body is obtained through at least one forming stretching and at least one thinning stretching. In this application, the forming stretching refers to the stretching process in which the piece is changed from sheet to cup (commonly referred to as "cup-punching"). The forming stretching also includes the stretching process in which the diameter and length of the cupping are changed. The thinning stretching refers to the stretching process in which the wall thickness of the cup-like part is made thinner. There are usually two kinds of stretching cases for thinning stretching. The first is the stretching process in which only the wall thickness changes, the inner diameter remains unchanged, and the outer diameter becomes smaller. The second is the stretching process in which the inner diameter changes, the outer diameter changes, and the wall thickness also changes. According to the existing technology, at least one forming stretching and one thinning stretching are required to stretch a metal sheet to the shape of battery case body in theory. When the combination of multiple forming stretching and multiple thinning stretching occurs, the thinning stretching can be crossed with the forming stretching in the process sequence, that is, the forming stretching is carried out, then the thinning stretching is carried out, then the forming stretching is carried out, and finally the thinning stretching is carried out. When there is a combination of one forming stretching and one or more thinning stretching, the forming stretching is usually carried out first. When there is a combination of multiple forming stretching and one thinning stretching, the first stretching should usually be forming stretching, and the thinning stretching can be arranged to be carried out last, or between the remaining forming stretchings. In fact, the order of forming stretching and thinning stretching is flexible, but the first stretching should be forming stretching and the remaining order of stretchings can be determined flexibly according to the material characteristics, the shape and dimension of the stretched object to be stretched and other parameters, which are the existing technologies known to those skilled in the art. In this application, the variable-wall-thickness stretching refers to the stretching process in which the wall thickness of a piece is subject to varied thickness changes in one stretching process. For example, in this application, the wall thickness of the middle section of the battery case body to be stretched is relatively thin, while the wall thickness at both ends or one end is relatively thick. The variable-wall-thickness stretching process is a special case of thinning stretching from the perspective of stretching technology. Because the innovation of the present application is the variable-wall-thickness stretching in the thinning stretching, and the forming stretching is a publicly known technology for the stretching of the battery case body, so when describing the existing technology in the technical scheme of the stretching process in the invention, only the thinning stretching is mentioned, while the forming stretching is not mentioned, which is understood by those skilled in the art, and is also the means of expression allowed by the provisions of the Patent Law.

2. In the above technical scheme of the stretching process, it's preferable that the female die is composed of at least two thinning rings, which are arranged coaxially with the stepped punch, and the inner diameters of the at least two thinning rings decreases successively along the punching direction. The two thinning rings actually realize two stretching processes in one stretching action, which is not prone to cause tensile fracture and improves the yield of stretching compared with one thinning ring. In practical application, the selection of several thinning rings can be determined according to the geometric dimensions of the battery case body, material characteristics, material thickness and yield control and other factors.

3. In the above technical scheme of the stretching process, it's preferable that the ratio of the wall thickness of the thinned piece after being thinned by the thinning ring corresponding to the thick rod section to the diameter of the thick rod section is 1:30. This requirement not only helps to optimize the stretching of the battery case body, but also further highlights the advantages of the variable-wall-thickness battery case body, and controls the easy elastic ejection of the battery case body after stretching at variable-wall-thickness position.

4. In the above technical scheme of the stretching process, it is preferable that the stepped punch is provided with an air transmission through-hole along the axial direction of its central axis, and the air transmission through-hole is connected with a compressed air device; in the variable-wall-thickness stretching, after the stepped punch completes the stretching action, the compressed air device blows air to the bottom of the thinned piece through the air transmission through-hole to eject the thinned piece.

5. In the above technical scheme of the stretching process, the punching equipment can be a punch press, a stretcher, or other mechanical and hydraulic equipment that can realize the stretching stroke. Among them, the stretcher can be a horizontal stretcher and can also be a vertical stretcher. The stepped punch of the horizontal stretcher realizes the stretching action in the horizontal direction, and the stepped punch of the vertical stretcher realizes the stretching action in the vertical direction. In order to ensure the accuracy of the stretching action, a punch guide device can also be set on the stretcher to guide the stepped punch to stretch along the stretching direction.

6. In the above technical scheme of the stretching process, the ratio of the difference between the radius difference between the thick and thin rod sections to the projected length of the tapered surface or/and curved surface in the axial direction is less than 0.2 in order to control the slope of the transition tapered surface or/and the curvature of the transition curved surface. This requirement mainly depends on the dimension and material performance of the battery case body. If the projection length of the tapered surface or curved surface in the axial direction is too long, the beneficial effect of the step structure will be weakened and the material saving will be insufficient; if the projection length is too short, the resistance of thinning and stretching is big, which is prone to cause tensile fracture and directly results in the rise of defect rate.

7. In the above technical scheme of the stretching process, the punching speed of the stepped punch is less than 400 times per minute in the variable-wall-thickness stretching process in order to ensure the stretching quality and production efficiency.

The design principles and beneficial effects of this application are:

In the stretching process of battery case body in this application, the variable-wall-thickness stretching is specially designed. The variable-wall-thickness stretching belongs to the thinning stretching. When the sheet or plate is stretched to the cup-shaped stretching piece by means of at least one-time forming stretching, and then through the thinning stretching, especially the variable-wall-thickness stretching with the stepped punch and at least one thinning ring to finally obtain the variable-wall-thickness battery case body with thin wall in the middle and thick wall at one end or both ends in the axial direction. The variable-wall-thickness battery case body can reduce the material consumption on the one hand and ensure the roll-sealing strength of one end or both ends of the case body on the other hand.

Due to the application of the above described technical scheme, the present application has the following advantages and effects in comparison with the prior art:

1. Compared with the existing cold-pressing process for preparing the battery case body, this application has well solved the contradictory problem between the amount of materials and the strength of the roll sealing caused by the wall thickness of the battery case body. The existing battery case all use the case body with the same wall thickness and when one end or two ends of the case body and the lid are sealed by the roll-sealing process, in order to ensure the sealing strength of the end of the case body, it's only required that the wall thickness of the case body meets a certain thickness requirement, and the wall thickness of the middle section of the case body can only follow the requirements for the ends. However, the thickness of the middle section of the case body can be further reduced from the perspective of the thickness requirements, but the effect of material saving can't be realized due to the limitation of process technology. This application uses the variable-wall-thickness stretching process to break through this limitation, thus solving this contradiction well.

2. In the variable-wall-thickness stretching, this application creatively designs a stepped punch for the battery case body as a male die: the stepped punch includes a thick rod section, and at least one end of the two ends of the thick rod section in the axial direction is connected with a thin rod section, and the thin rod section corresponds to the axial end of the stretched piece of the case body. Through backward extrusion and stretching, the thick wall sections are formed at the top and/or bottom of the battery case body, while the thin wall section is formed at the middle section of the battery case body.

This technical feature has a significant effect. Firstly, the connection method between the battery case body and the lid produced by the stretching process of this application is suitable for the roll-sealing process (equivalent to the roll-sealing of the ring-pull case body and the lid). Compared with the welding sealing of the prior art, the roll-sealing not only has high reliability, but also saves the arrangement space of the battery cases, which is conducive to improving the utilization rate of the space in the battery pack. Secondly, compared with the conventional case body with the same wall thickness, the variable-wall-thickness case body obtained by the stretching process of this application has the end section with thick wall and middle section with thin wall, which can not only effectively avoid the tearing of the end of the case body during the roll-sealing process, but also effectively improve the reliability during the use. Secondly, the thin-walled section of the case body can effectively reduce the material consumption, thus reducing the material cost, and also help to reduce the weight of the case body and improve the internal volume of the case body, thus improving the energy density of the overall battery pack.

3. In this application, the combination of multiple thinning rings can improve production efficiency and reduce equipment costs, and the design of the multiple thinning rings is also generally applicable to metal case materials with different ductility.

4. In this application, the process and structural constraint of matching the stepped punch with the dimension of the thinning ring are designed, which not only helps to further highlights the advantages of the variable-wall-thickness battery case body, but also helps to control the easy elastic ejection of the battery case body.

5. In this application, the punch is preferably provided with an air transmission through-hole along the axial direction of its central axis, and the air transmission through-hole is connected with a compressed air device to blow air after the completion of the stretching action to help with the elastic ejection for smooth ejection.

In the above described drawings: 1. First punch press; 2. Sheet material; 3. Cup-shaped piece; 4. First die; 5. Second punch press; 6. Re-stretched piece; 7. Second die; 8. Stretcher; 9. Thinned piece; 10. Stepped punch; 11. Thin rod section; 12. Thick rod section; 13. Tapered surface; 14. Thinning ring; 15. Punch guide device; 16. Thin wall section; 17. Thick wall section.

SPECIFIC EMBODIMENT

With reference to the accompanying drawings and embodiment, the present application will be described in detail.

Embodiment: A Stretching Process for Battery Case Body

Figure 1:
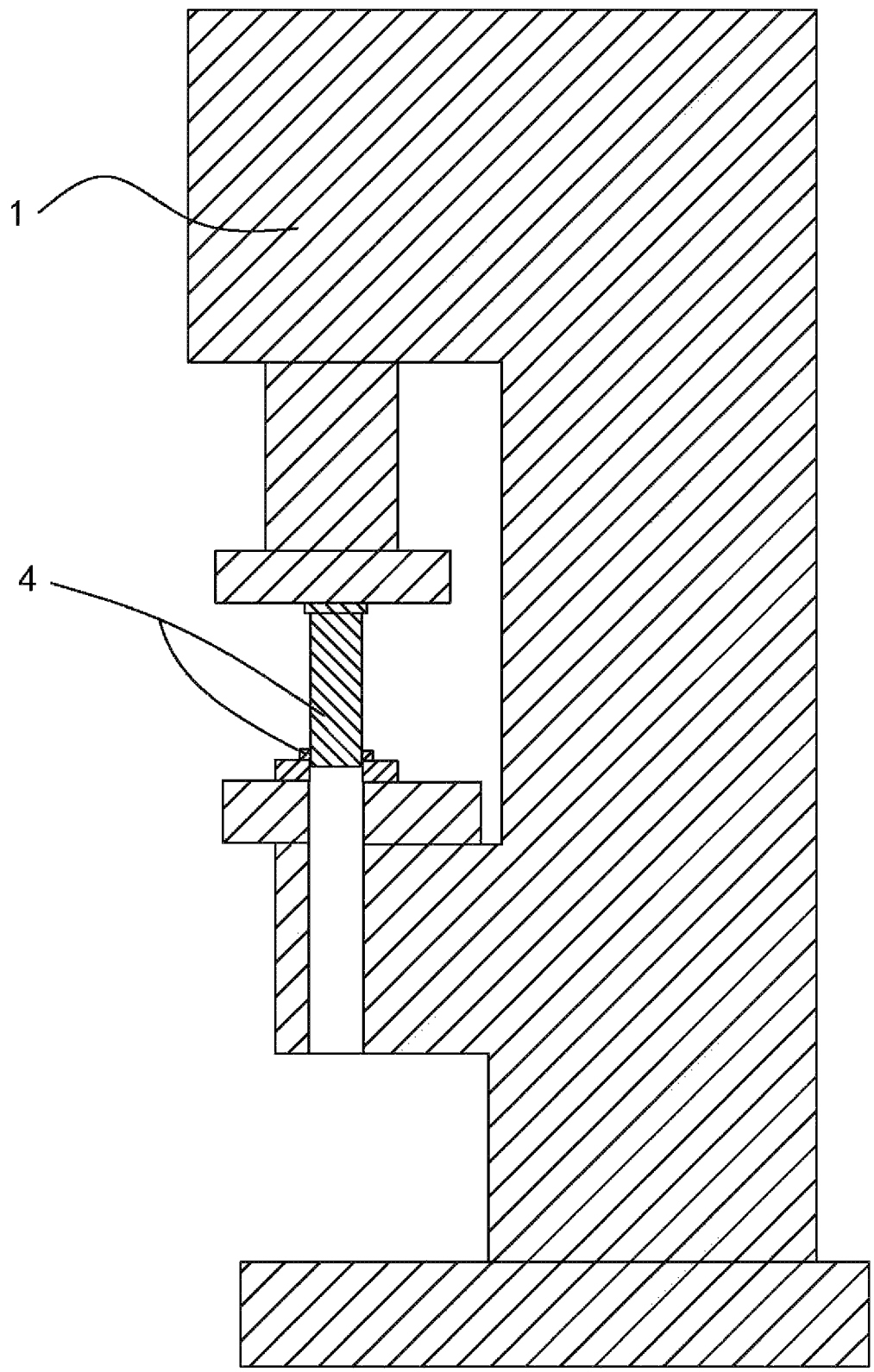
FIG. 1 is a schematic view of the first punch press equipped with a die in this application.
Figure 6:
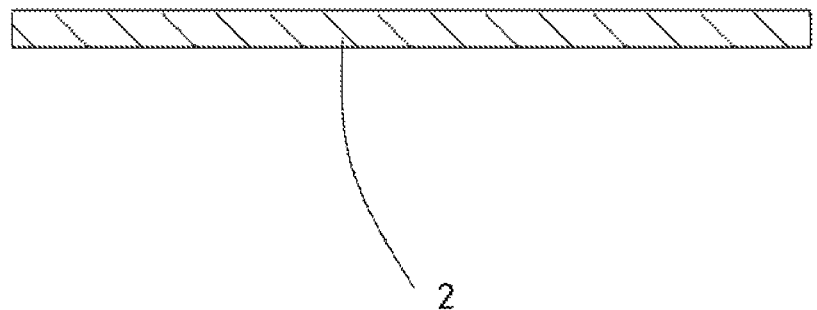
FIG. 6 is the schematic view of sheet material during the formation of the battery case body of the application.
Figure 7:
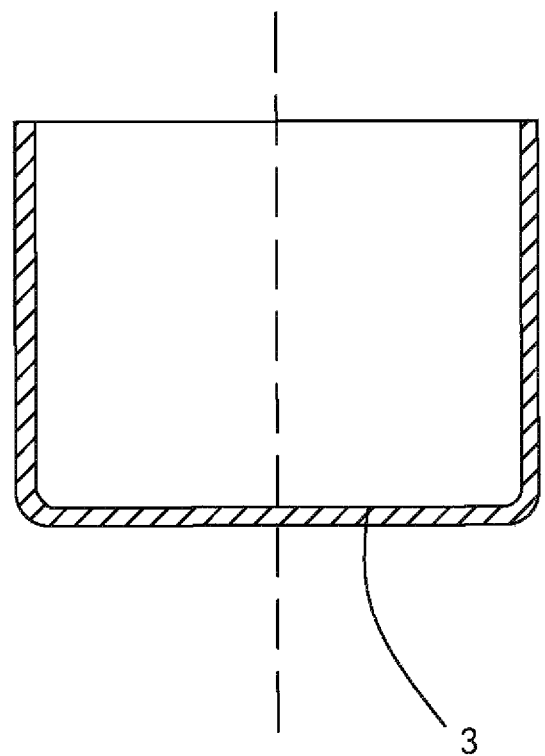
FIG. 7 is the schematic view of the cup-shaped piece during the formation of the battery case body of the application.

Please refer to FIGS. 1 to 9, a stretching process for battery case body, which is used to stretch out the variable-wall-thickness case body suitable for end roll-sealing, that is, the middle of the case body in axial direction is thin wall section 16, and the two ends are thick wall section 17. The process includes the following stretching steps:

Step 1: Cupping (this step belongs to forming stretching). As shown in FIG. 1, FIG. 6 and FIG. 7, use the first punch press 1 to press the sheet 2 through the first die 4 to obtain the cup-shaped piece 3.

Figure 2:
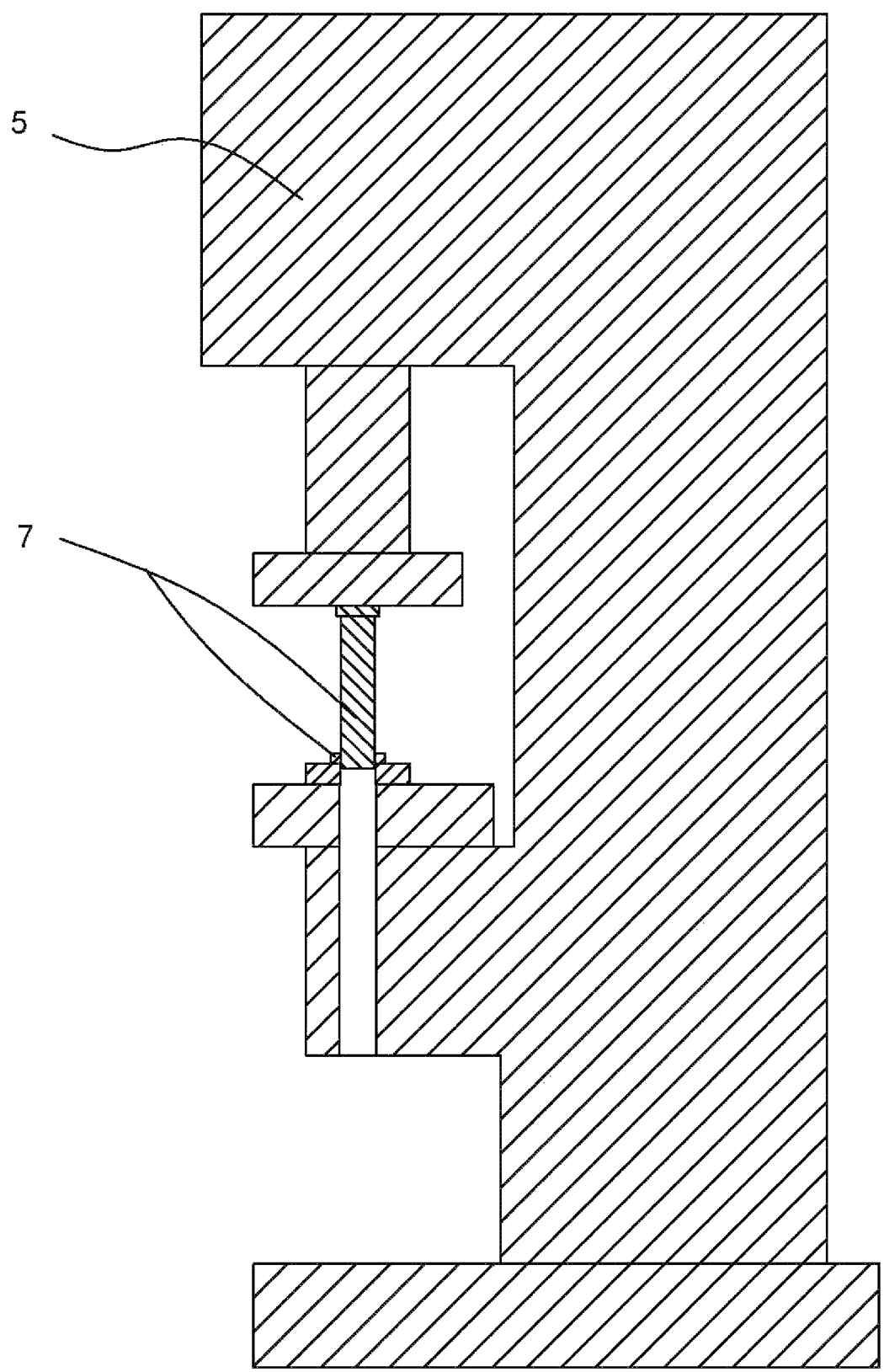
FIG. 2 is a schematic view of the second punch press equipped with a die in this application.
Figure 8:
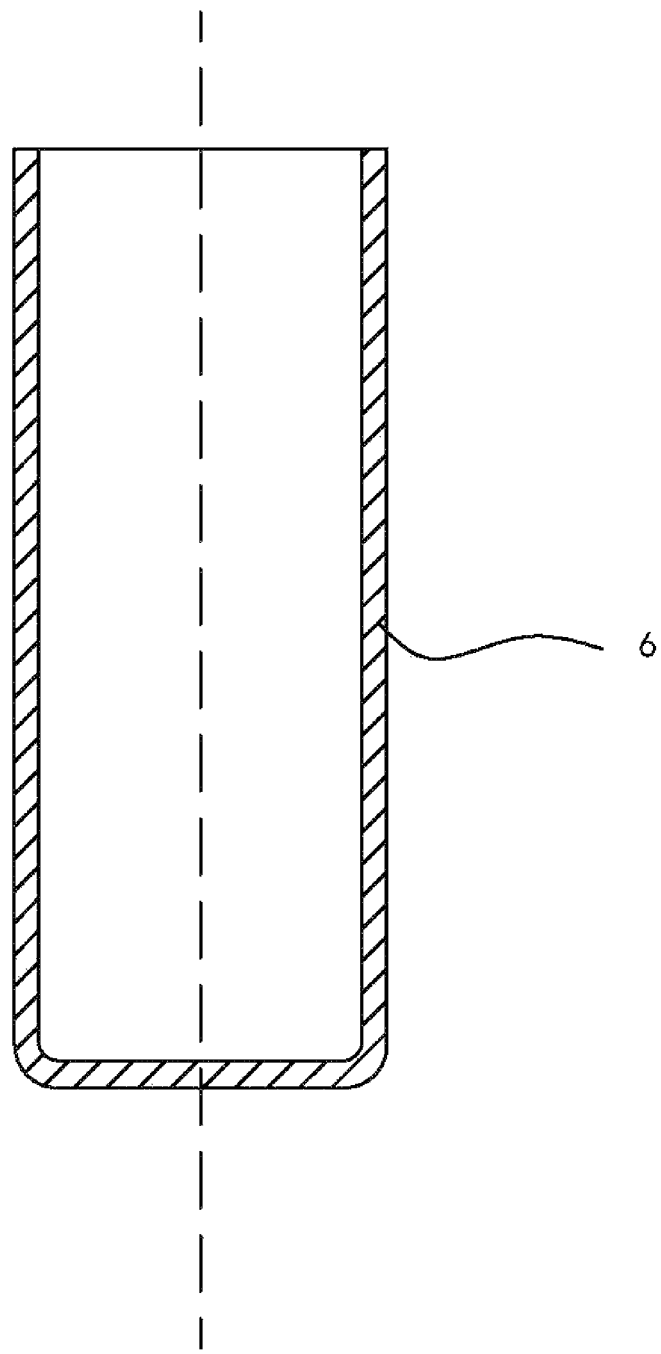
FIG. 8 is the schematic view of the re-stretched piece during the formation of the battery case body of the application.

Step 2: Re-stretching (this step belongs to forming stretching). As shown in FIG. 2, FIG. 7 and FIG. 8, use the second punch press 5 to press the cup-shaped piece 3 through the second die 7 for forming to obtain the re-stretched cup-shaped piece 6, and the inner diameter of the re-stretched piece 6 is less than the inner diameter of the cup-shaped piece 3, and the height of the re-stretched piece 6 is greater than the height of the cup-shaped piece 3.

Figure 3:
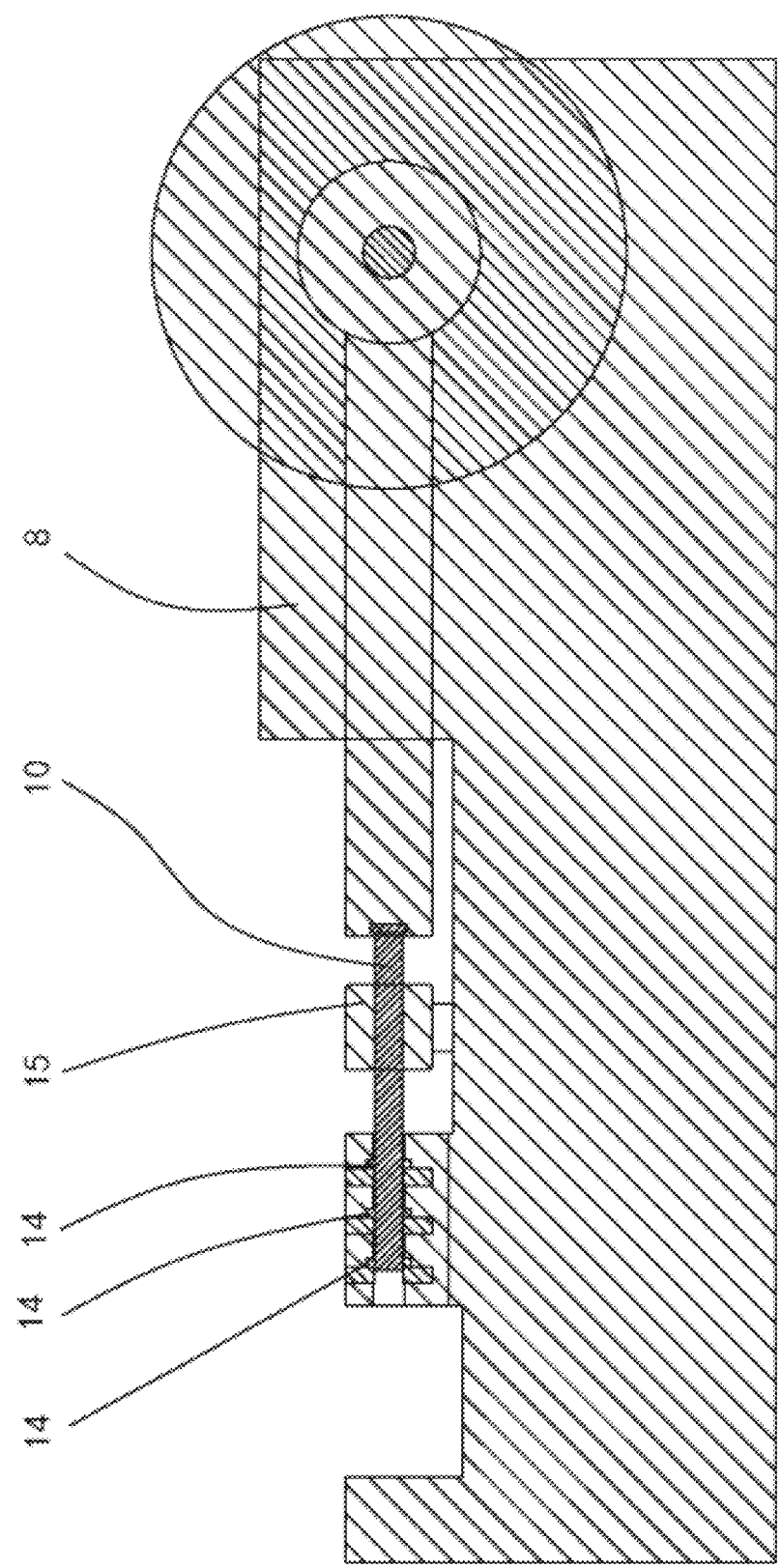
FIG. 3 is a schematic view of the stretcher equipped with a die in this application.
Figure 9:
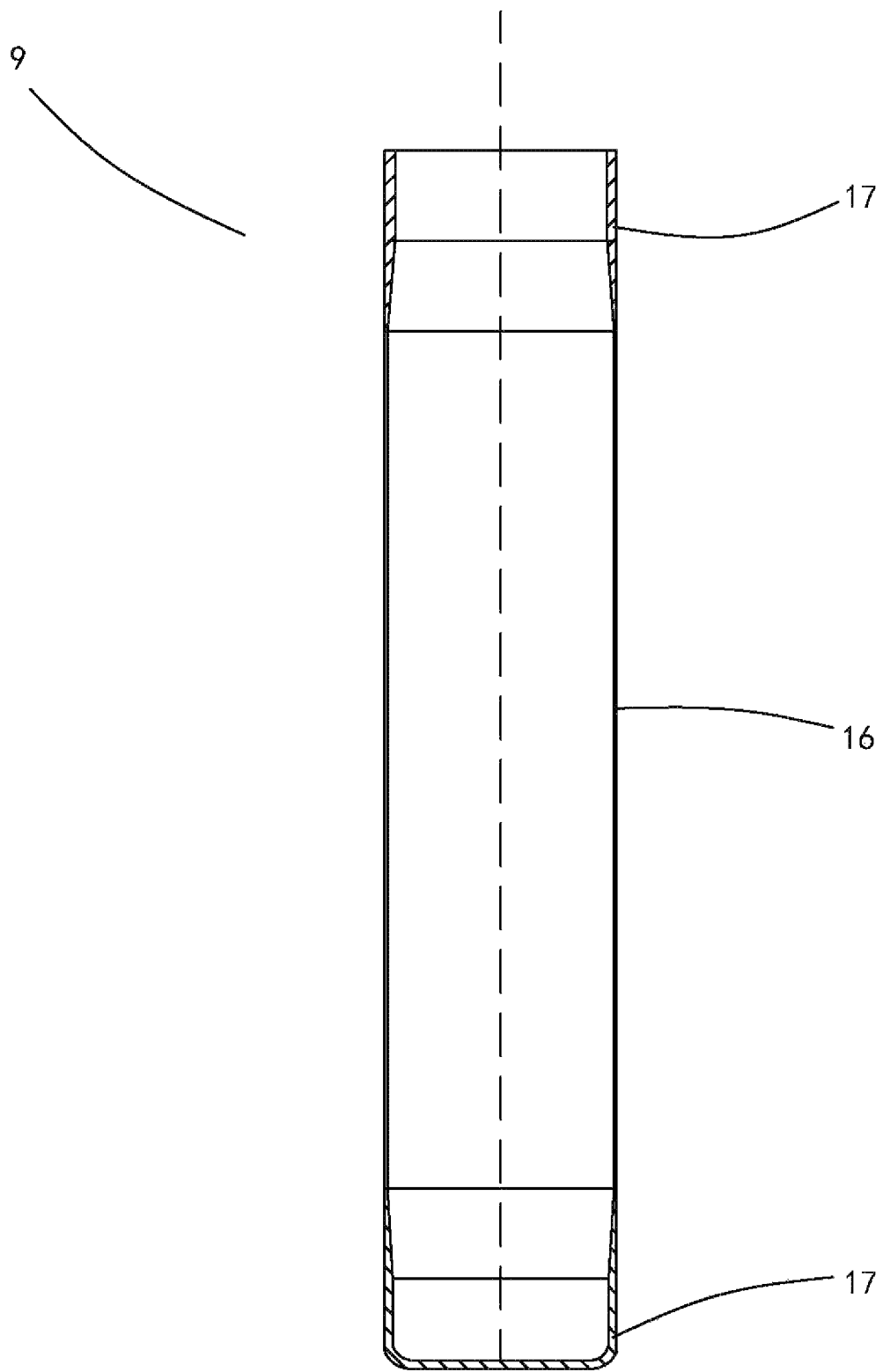
FIG. 9 is the schematic view of the thinned piece during the formation of the battery case body of the application.

Step 3: Thinning (this step belongs to the variable-wall-thickness stretching in thinning stretching). As shown in FIG. 3, FIG. 8 and FIG. 9, the stretcher 8 is used to stretch the re-stretched piece 6 for thinning stretching through the stepped punch 10 used as a male die and the three thinning rings 14 used as a female die to obtain the thinning piece 9; the three thinning rings 14 are arranged coaxially with the stepped punch 10 respectively. In the thinning step, the stepped punch 10 passes through each thinning ring 14 sequentially. In this embodiment, the punching speed of the stepped punch 10 is less than 400 times per minute.

Figure 4:
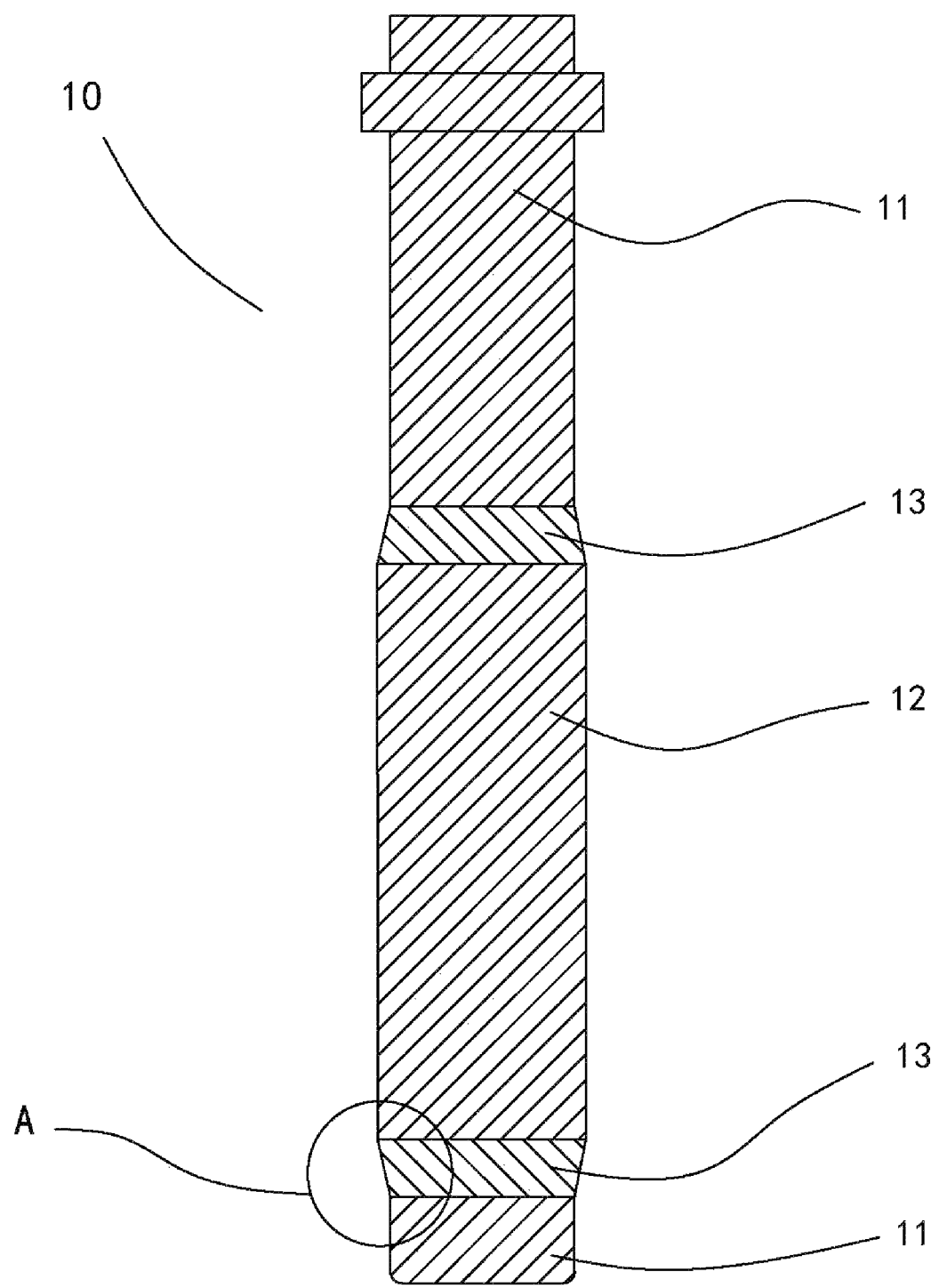
FIG. 4 is a schematic view of the stepped punch in this application.
Figure 5:
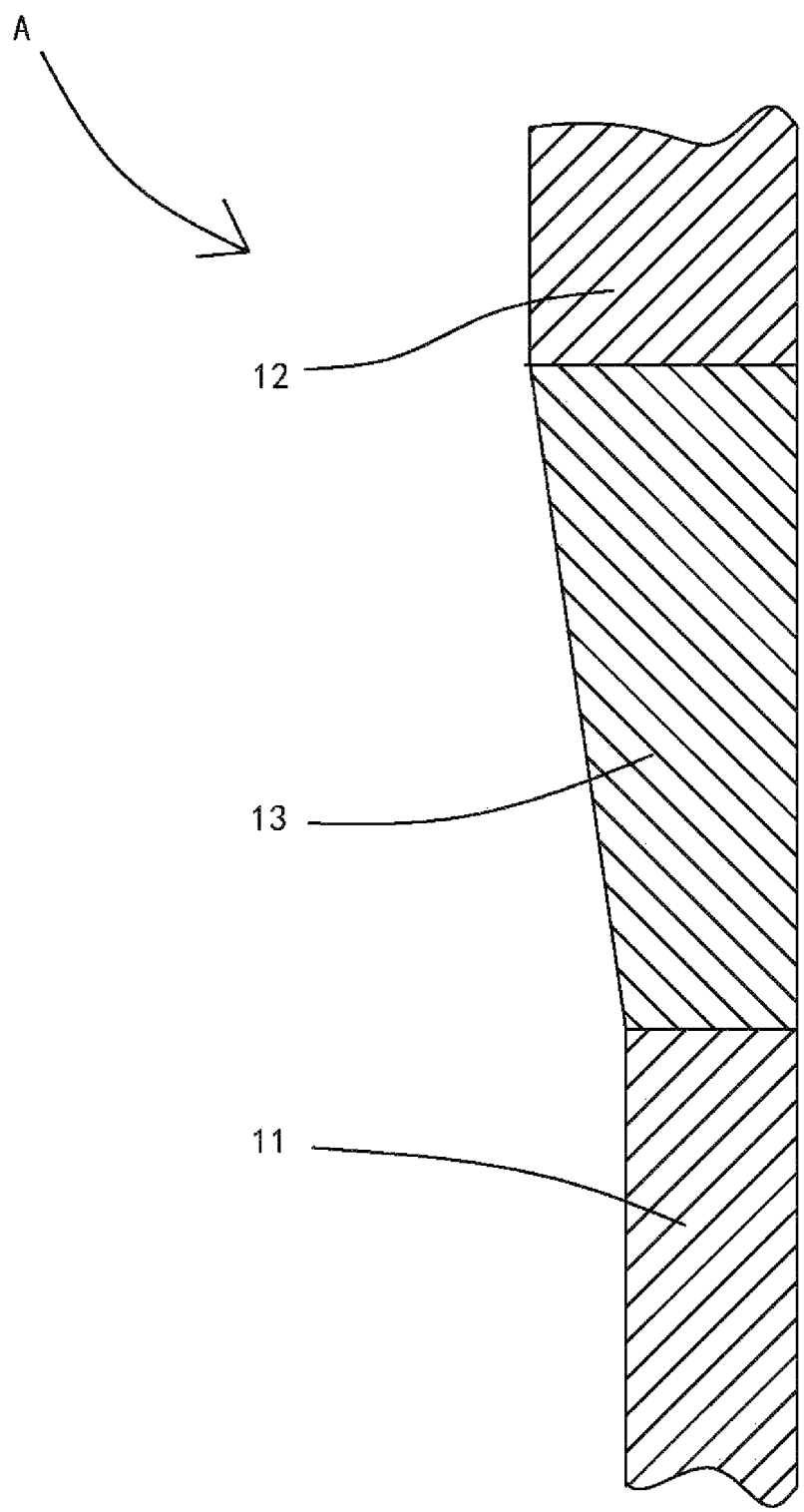
FIG. 5 is a local enlarged view of FIG. 4.

As shown in FIG. 4 and FIG. 5, the body of the stepped punch 10 is a cylinder, and the stepped punch 10 is provided with a thick rod section 12, and the thick rod section 12 is provided with thin rod sections 11 on two ends in the axial direction. In this embodiment, the difference between the radius of the thick rod section 12 and the radius of the thin rod section 11 is less than or equal to 0.3 mm and the radius ratio of the two is less than or equal to 101:100. The thin rod section 11 and the thick rod section 12 are transitioned through at least one tapered surface (one tapered surface was used in this embodiment and two tapered surfaces can be used), and the ratio of the difference between the radius difference between the thick rod section 12 and thin rod section 11 to the projected length of the tapered surface in the axial direction is less than 0.2.

Three thinning rings 14 are arranged coaxially with the stepped punch 10, and the inner diameters of three thinning rings 14 decreases successively along the punching direction. The difference between the inner diameter of the thinning ring 14 and the diameter of the thick rod section 12 of the stepped punch 10 is less than twice the wall thickness of the case body to be thinned.

As shown in FIG. 9, in the process of variable-wall-thickness stretching, the stepped punch 10 drives the piece to pass through each thinning ring 14 sequentially, and then leave the die to obtain the thinned piece 9. The thinning piece comprises a thin wall section corresponding to the thick rod section of the stepped punch and a thick wall section corresponding to the thin rod section of the stepped punch, the thick wall section is located at one or both ends of the axial direction of the thinning piece, and there is at least one tapered surface or/and curved surface transition between the thin wall section and the thick wall section. In this embodiment, the ratio of the wall thickness of the thinned piece 9 after being thinned by the thinning ring 14 corresponding to the thick rod section 12 to the diameter of the thick rod section 12 is 1:30. In this embodiment, the raw material of the battery case body is aluminum alloy, specifically aluminum alloy sheet or aluminum alloy plate.

As shown in FIG. 3, in this embodiment, the stretcher 8 is a horizontal stretcher, and the stepped punch 10 stretches in a horizontal direction. The stretcher 8 is also provided with a punch guide device 15 to guide the stepped punch 10 to stretch in a horizontal direction.

In this embodiment, the stepped punch 10 is provided with an air transmission through-hole along the axial direction of its central axis, and the air transmission through-hole is connected with a compressed air device. In the variable-wall-thickness stretching, after the stepped punch 10 completes the stretching action, the compressed air device blows air to the bottom of the thinned piece 9 through the air transmission through-hole to eject the thinned piece 9.

The following is the description about the other embodiment and structural changes of the present application:

1. In the above embodiment, a tapered surface transition is provided between the thin wall section 16 and the thick wall section 17. However, this application is not limited to this. Two tapered surface transitions or three tapered surface transitions can be used, or one curved surface transition or two curved surface transitions can be used, or even a transition of a combine tapered surface and curved surface can be used. These changes can be determined and selected according to the specific situation. It can be understood and accepted by those skilled in the art.
2. In the above embodiment, the punching speed of the stepped punch 10 is less than 400 times per minute. However, this application is not limited to this. The punching speed of stepped punch 10 can be set to be greater than or equal to 400 times per minute. It shall be determined whether the stretching effect and yield can meet the corresponding requirements when the production efficiency is improved like this.
3. In the above embodiment, three thinning rings 14 were used to form a female die, but this application is not limited to this. In theory, at least one thinning ring 14 is used. It is preferable to use two thinning rings 14, and three thinning rings 14 were optimally used in this embodiment. More thinning rings can also be used. In practical application, the selection of several thinning rings can be determined according to the geometric dimensions of the battery case body, material characteristics, material thickness and yield control and other factors. It can be understood and accepted by those skilled in the art.

4. In the above embodiment, the raw material of the battery case body is preferably aluminum alloy, such as aluminum alloy sheet or aluminum alloy plate, or aluminum alloy ingot. However, this application is not limited to the selection of aluminum alloy as raw material, but also other materials, such as stainless steel, copper, copper alloy and other metal materials suitable for stretching forming.

5. In the above embodiment, "the first punch press" and "the second punch press" are two punch presses, but this application is not limited to them. "The first punch press" and "the second punch press" can also be the same one. In this case, the first die can be installed on the punch, and the sheet material can be punched to form a cup-shaped piece, then the first die can be removed, the second die can be installed on the punch press, and then the cup-shaped piece can be punched to form a re-stretched piece with small diameter; and the progress die can be used on the same punch press. It can be understood and accepted by those skilled in the art.

6. In the above embodiment, the thick rod section of the stepped punch was provided with thin rod sections at two end in the axial direction. Correspondingly, the two ends of the thinning piece were provided with thick wall sections, but this application is not limited to this. The thin rod section can also be set only at one end of the thick rod section of the stepped punch in the axial direction, and the corresponding end of the thinning piece forms a thick wall section, which can be understood and accepted by those skilled in the art.

7. In the above embodiment, the stretcher is a horizontal stretcher, and the stretching action of the stepped punch is set in the horizontal direction. But this application is not limited to this. For example, the stretcher can also be vertical. Accordingly, the stretching action of the stepped punch is set in the vertical direction, but this vertical stretcher requires higher space height to accommodate the machine. It can be understood and accepted by those skilled in the art.

8. In the above embodiment, the battery case body can be formed by one cupping step, one re-stretching step and one thinning step. However, this application is not limited to this. The stretching process of the battery case body in this application can include multiple re-stretching steps and multiple thinning steps. In this application, the cupping step belongs to forming stretching, and the re-stretching step also belongs to forming stretching. The forming stretching refers to the stretching process in which the piece is changed from sheet to cup (commonly referred to as "cup-punching"). The forming stretching also includes the stretching process in which the diameter and length of the cupping are changed. The essence of forming stretching is mainly to change the shape and dimension of the stretching piece. In this application, the thinning step belongs to thinning stretching, and the thinning step in the above embodiment is essentially a variable-wall-thickness stretching. In fact, in this embodiment, the equal-wall-thickness thinning stretching can also be arranged, and the stretching can be arranged before the variable-wall-thickness stretching step, and even the equal-wall-thickness thinning stretching can be arranged between the two forming stretching steps. In fact, the order of forming stretching and thinning stretching is flexible, but the first stretching should be forming stretching and the remaining order of stretchings can be determined flexibly, and the re-stretching step and thinning step can even be arranged alternately. In practical, it can be determined according to the material characteristics, the shape and dimension of the stretched object to be stretched and other parameters, which are the existing technologies known to those skilled in the art.

It should be noted that the above described embodiment are only for illustration of technical concept and characteristics of present application with purpose of making those skilled in the art understand the present application, and thus these embodiment shall not limit the protection range of present application. The equivalent changes or modifications according to spiritual essence of present application shall fall in the protection scope of present application.

The invention claimed is:

1. A cylindrical stepped punch for stretching a battery case body comprising:
   a first section having a first radius;
   a second section on at least one end in an axial direction of the punch, the second section having a second radius smaller than the first radius; and
   a tapered and/or curved section between the first section and the second section, wherein
   a difference between the first radius and the second radius is less than or equal to 0.3 mm,
   a ratio of the first radius to the second radius is less than or equal to 101:100;
   a slope of the tapered and/or curved section is defined as being a ratio of (i) a difference between the first and the second radius to (ii) an axial length of the tapered and/or curved section, and
   the slope of the tapered and/or curved section is less than 0.2.

2. A die for stretching a battery case body comprising:
   a male die including a cylindrical stepped punch, the stepped punch comprising:
      a first section having a first radius;
      a second section on at least one end in an axial direction of the punch, the second section having a second radius smaller than the first radius; and
      a tapered and/or curved section between the first section and the second section; and
   a female die comprising, at least two thinning rings arranged coaxially with the stepped punch, inner diameters of the at least two thinning rings decreasing successively along a punching direction, wherein;
   a difference between the first radius and the second radius is less than or equal to 0.3 mm,
   a ratio of the first radius to the second radius is less than or equal to 101:100,
   a slope of the tapered and/or curved section is defined as being a ratio of (i) a difference between the first radius and the second radius to (ii) an axial length of the tapered and/or curved section,
   the slope of the tapered and/or curved section is less than 0.2,
   the die is configured to provide:
      a difference between an inner diameter of the thinning ring and a diameter of the first section of the stepped punch is less than twice a wall thickness of the case body to be thinned, and a ratio of a wall thickness of the thinned workpiece after being thinned by the thinning ring corresponding to the first section to the diameter of the first section is 1:30.

3. The die for stretching a battery case body according to claim 2, wherein:
the female die comprises three thinning rings arranged coaxially with the stepped punch;
the inner diameters of the three thinning rings decrease successively along the punching direction; and
the three thinning rings are positioned to engage a workpiece sequentially in a single pass of the stepped punch.

4. A stretching process for forming a battery case body from an aluminum alloy sheet or aluminum alloy plate workpiece, comprising:
providing a die comprising:
a male die including a cylindrical stepped punch, the stepped punch comprising:
a first section having a first radius;
a second section on at least one end in an axial direction of the punch, the second section having a second radius smaller than the first radius;
a tapered and/or curved section between the first section and the second section;
an air transmission through-hole along an axial direction of a central axis of the stepped punch, the air transmission through-hole connected to a compressed air device;
a female die comprising at least two thinning rings arranged coaxially with the stepped punch, inner diameters of the at least two thinning rings decreasing successively along a punching direction,
wherein
a difference between the first radius and the second radius is less than or equal to 0.3 mm,
a ratio of the first radius to the second radius is less than or equal to 101:100,
a slope of the tapered and/or curved section is defined as being a ratio of (i) a difference between the first radius and the second radius to (ii) an axial length of the tapered and/or curved section, and the slope is less than 0.2,
a difference between an inner diameter of each thinning ring and a diameter of the first section of the stepped punch is less than twice a wall thickness of the case body being processed;
performing variable-wall-thickness stretching by driving, by the stepped punch, the workpiece to pass through each thinning ring sequentially to form a thinned workpiece comprising:
a thin wall section corresponding to the first section of the stepped punch;
a thick wall section corresponding to the second section of the stepped punch, the thick wall section being located at one or both ends of the axial direction of the thinned workpiece; and
a tapered and/or curved transition between the thin wall section and the thick wall section; and
ejecting the thinned workpiece by blowing compressed air through the air transmission through-hole to a bottom of the thinned workpiece.

5. The stretching process of battery case body according to claim 4, wherein: the variable-wall-thickness stretching is performed such that the ratio of the wall thickness of the thinned workpiece after being thinned by the thinning ring corresponding to the first section to the diameter of the first section is 1:30.

\* \* \* \* \*